United States Patent
De La Torre et al.

(10) Patent No.: US 9,665,297 B1
(45) Date of Patent: May 30, 2017

(54) INJECTION OF AT LEAST A PARTIAL CACHE LINE IN A PRIVATE MULTILEVEL CACHE HIERARCHY

(71) Applicant: INTERNATIONAL BUSINESS MACHINES CORPORATION, Armonk, NY (US)

(72) Inventors: Luis E. De La Torre, Austin, TX (US); Bernard C. Drerup, Austin, TX (US); Sanjeev Ghai, Round Rock, TX (US); Guy L. Guthrie, Austin, TX (US); Alexander M. Taft, Austin, TX (US); Derek E. Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/333,851

(22) Filed: Oct. 25, 2016

(51) Int. Cl.
    G06F 3/06 (2006.01)
    G06F 12/0811 (2016.01)
    G06F 12/0831 (2016.01)
    G06F 12/0891 (2016.01)

(52) U.S. Cl.
    CPC ............ G06F 3/0619 (2013.01); G06F 3/065 (2013.01); G06F 3/0685 (2013.01); G06F 12/0811 (2013.01); G06F 12/0831 (2013.01); G06F 12/0891 (2013.01); *G06F 2212/283* (2013.01); *G06F 2212/621* (2013.01)

(58) Field of Classification Search
    CPC ...... G06F 3/0619; G06F 3/065; G06F 3/0685; G06F 12/0811; G06F 12/0831; G06F 12/0891

USPC .................. 711/122, 141, 144, 146, 154, 156
    See application file for complete search history.

(56) References Cited

U.S. PATENT DOCUMENTS

| | | | | |
|---|---|---|---|---|
| 7,302,528 | B2* | 11/2007 | Cabot | G06F 12/0888 711/138 |
| 7,366,841 | B2* | 4/2008 | Clark | G06F 12/0822 711/118 |
| 9,418,007 | B2* | 8/2016 | Guthrie | G06F 12/08 |
| 9,430,380 | B2* | 8/2016 | Guthrie | G06F 12/08 |
| 9,501,411 | B2* | 11/2016 | Guthrie | G06F 12/0833 |
| 9,514,049 | B2* | 12/2016 | Guthrie | G06F 12/0833 |
| 2008/0077740 | A1* | 3/2008 | Clark | G06F 12/0822 711/122 |
| 2010/0268884 | A1* | 10/2010 | Cummings | G06F 12/0822 711/122 |
| 2015/0139326 | A1* | 5/2015 | Lin | H04N 19/433 375/240.16 |

* cited by examiner

*Primary Examiner* — Stephen Elmore
(74) *Attorney, Agent, or Firm* — Brian F. Russell; Steven L. Bennett

(57) ABSTRACT

A processor core is supported by an upper level cache and a lower level cache that receives, from an interconnect fabric, a write injection request requesting injection of a partial cache line of data into a target cache line identified by a target real address. In response to receipt of the write injection request, a determination is made that the upper level cache is a highest point of coherency for the target real address. In response to the determination, the upper level cache and lower level cache collaborate to transfer the target cache line from the upper level cache to the lower level cache. The lower level cache updates the target cache line by merging the partial cache of data into the target cache line and storing the updated target cache line in the lower level cache.

20 Claims, 9 Drawing Sheets

INJECTION OF AT LEAST A PARTIAL CACHE LINE IN A PRIVATE MULTILEVEL CACHE HIERARCHY

BACKGROUND OF THE INVENTION

The present invention relates generally to data processing and, in particular, to injection of at least a partial cache line into a multilevel cache hierarchy.

A conventional multiprocessor (MP) computer system, such as a server computer system, includes multiple processing units all coupled to a system interconnect, which typically comprises one or more address, data and control buses. Coupled to the system interconnect is a system memory, which represents the lowest level of volatile memory in the multiprocessor computer system and which generally is accessible for read and write access by all processing units. In order to reduce access latency to instructions and data residing in the system memory, each processing unit is typically further supported by a respective multilevel cache hierarchy, the lower level(s) of which may be shared by one or more processor cores.

Cache memories are commonly utilized to temporarily buffer memory blocks that might be accessed by a processor in order to speed up processing by reducing access latency introduced by having to load needed data and instructions from system memory. In some MP systems, the cache hierarchy includes at least two levels. The level one (L1) or upper-level cache is usually a private cache associated with a particular processor core and cannot be accessed by other cores in an MP system. Typically, in response to a memory access instruction such as a load or store instruction, the processor core first accesses the directory of the upper-level cache. If the requested memory block is not found in the upper-level cache, the processor core then accesses lower-level caches (e.g., level two (L2) or level three (L3) caches) or system memory for the requested memory block.

BRIEF SUMMARY

In at least some embodiments, a processor core is supported by an upper level cache and a lower level cache that receives, from an interconnect fabric of a data processing system, a write injection request requesting injection of a partial cache line of data into a target cache line identified by a target real address. In response to receipt of the write injection request, a determination is made that the upper level cache is a highest point of coherency for the target real address. In response to the determination, the upper level cache and lower level cache collaborate to transfer the target cache line from the upper level cache to the lower level cache. The lower level cache updates the target cache line by merging the partial cache of data into the target cache line and storing the updated target cache line in the lower level cache.

DETAILED DESCRIPTION

Figure 1:
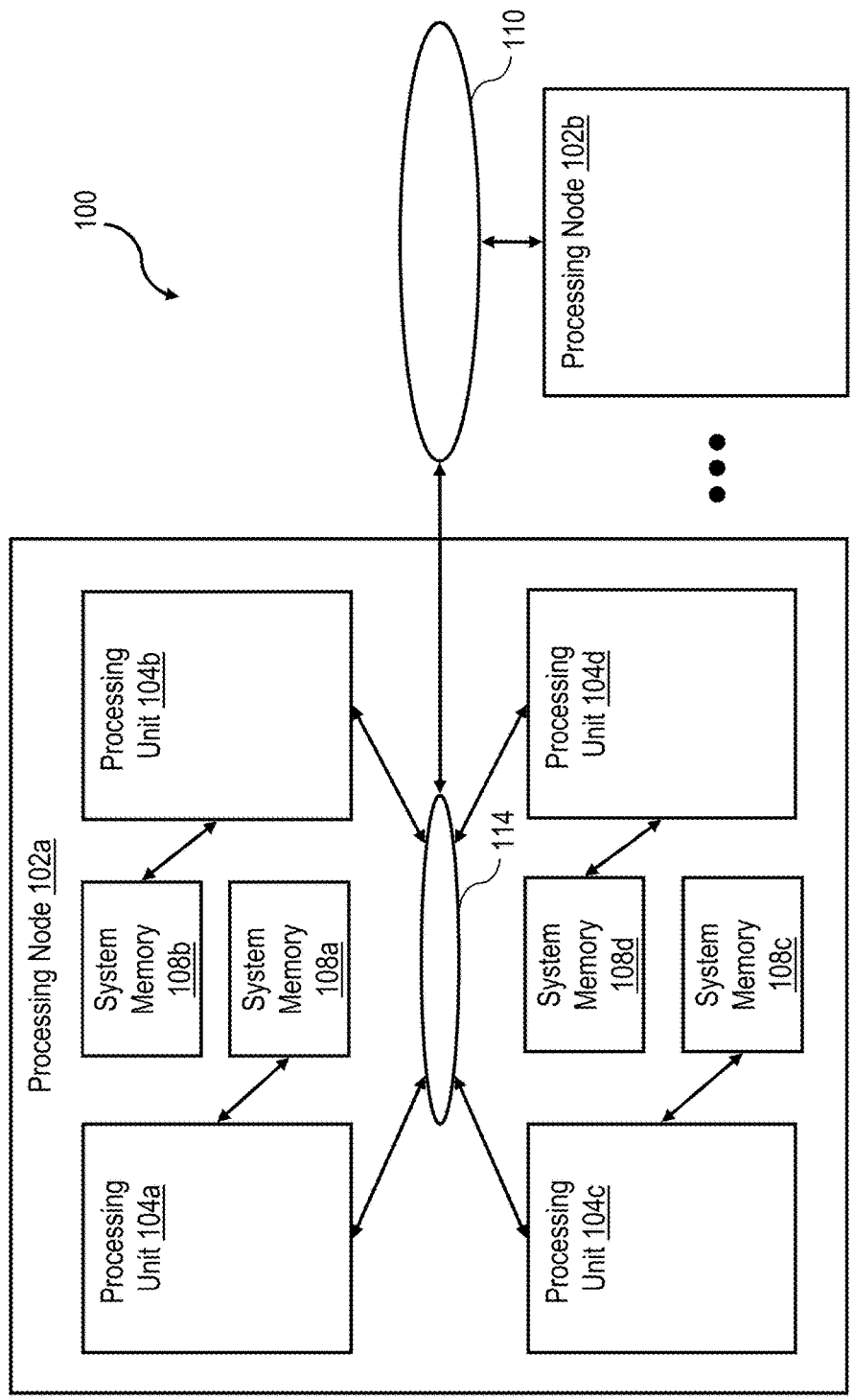
FIG. 1 is a high-level block diagram of an exemplary data processing system in accordance with one embodiment.

With reference now to the figures, wherein like reference numerals refer to like and corresponding parts throughout, and in particular with reference to FIG. 1, there is illustrated a high level block diagram depicting an exemplary data processing system 100 in accordance with one embodiment. In the depicted embodiment, data processing system 100 is a cache coherent symmetric multiprocessor (SMP) data processing system including multiple processing nodes 102a, 102b for processing data and instructions. Processing nodes 102 are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing multiple (e.g., four) processing units 104a-104d, each preferably realized as a respective integrated circuit. The processing units 104 within each processing node 102 are coupled for communication to each other and system interconnect 110 by a local interconnect 114, which, like system interconnect 110, may be implemented, for example, with one or more buses and/or switches. System interconnect 110 and local interconnects 114 together form an interconnect fabric.

As described below in greater detail with reference to FIG. 2, processing units 104 each include a memory controller 206 coupled to local interconnect 114 to provide an interface to a respective system memory 108. Data and instructions residing in system memories 108 can generally be accessed, cached and modified by a processor core in any processing unit 104 of any processing node 102 within data processing system 100. System memories 108 thus form the lowest level of volatile storage in the distributed shared memory system of data processing system 100. In alternative embodiments, one or more memory controllers 206 (and system memories 108) can be coupled to system interconnect 110 rather than a local interconnect 114.

Those skilled in the art will appreciate that SMP data processing system 100 of FIG. 1 can include many additional non-illustrated components, such as interconnect bridges, non-volatile storage, ports for connection to networks or attached devices, etc. Because such additional components are not necessary for an understanding of the described embodiments, they are not illustrated in FIG. 1 or discussed further herein. It should also be understood, however, that the enhancements described herein are applicable to cache coherent data processing systems of diverse architectures and are in no way limited to the generalized data processing system architecture illustrated in FIG. 1.

Figure 2:
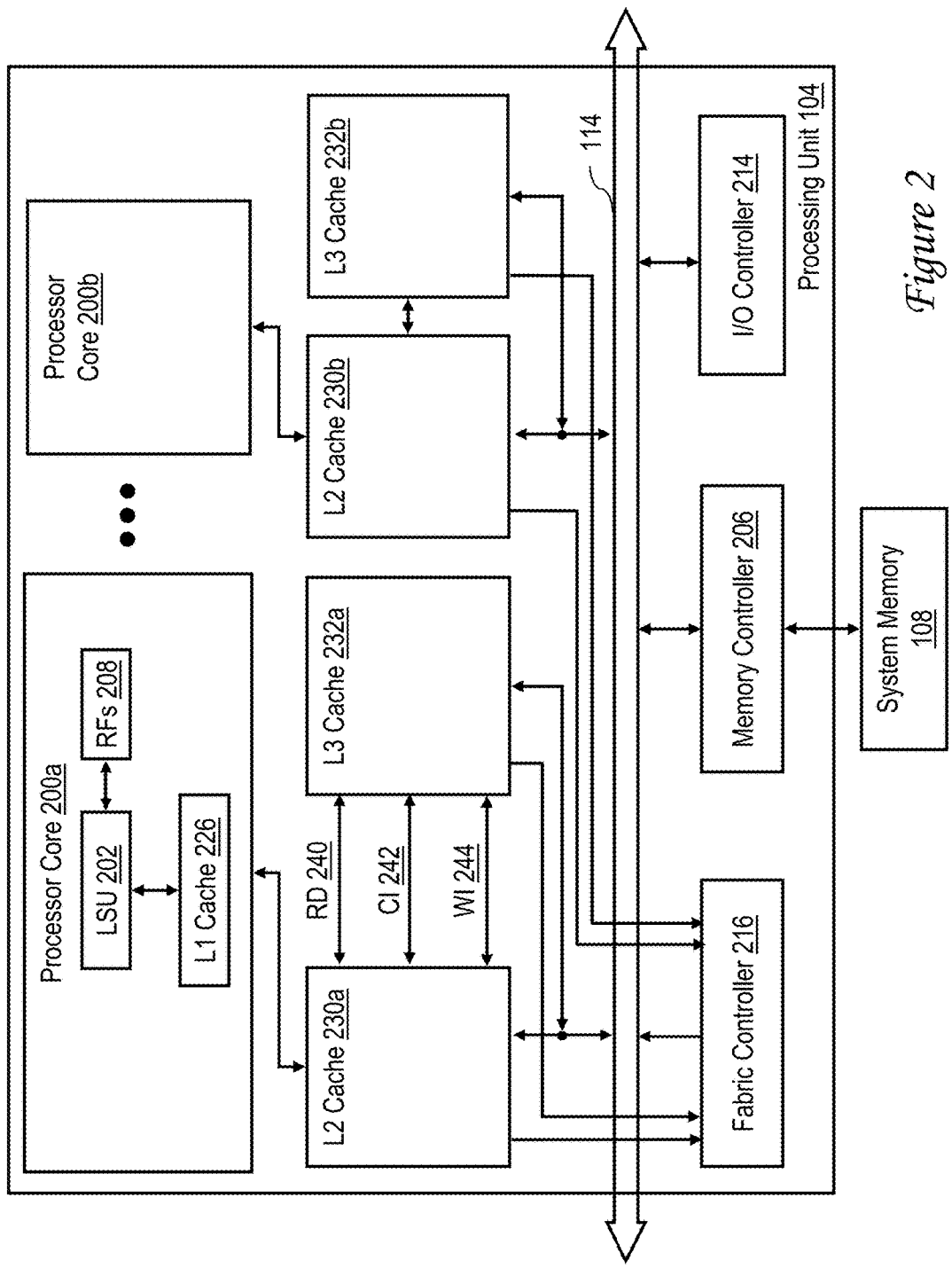
FIG. 2 is a more detailed block diagram of an exemplary processing unit in accordance with one embodiment.

Referring now to FIG. 2, there is depicted a more detailed block diagram of an exemplary processing unit 104 in accordance with one embodiment. In the depicted embodiment, each processing unit 104 is an integrated circuit including two or more processor cores 200a, 200b for processing instructions and data. In at least some embodiments, each processor core 200 is capable of independently executing multiple simultaneous hardware threads of execution.

As depicted, each processor core 200 includes one or more execution units, such as load-store unit (LSU) 202, for executing instructions. The instructions executed by LSU 202 include memory access instructions that request load or store access to a memory block in the distributed shared memory system or cause the generation of a request for load or store access to a memory block in the distributed shared memory system. Memory blocks obtained from the distributed shared memory system by load accesses are buffered in one or more register files (RFs) 208, and memory blocks updated by store accesses are written to the distributed shared memory system from the one or more register files 208.

The operation of each processor core 200 is supported by a multi-level memory hierarchy having at its lowest level a shared system memory 108 accessed via an integrated memory controller 206, and at its upper levels, one or more levels of cache memory, which in the illustrative embodiment include a store-through level one (L1) cache 226 within and private to each processor core 200, a respective store-in level two (L2) cache 230a, 230b for each processor core 200a, 200b, and a respective lookaside level three (L3) victim cache 232a, 232b for each processor core 200a, 200b populated with cache lines evicted from one or more of L2 caches 230. As shown in detail for L2 cache 230a and L3 cache 232a, each L2-L3 cache interface includes a number of channels, including read (RD) channel 240, cast-in (CI) channel 242, and a write inject (WI) channel 244. Each of L2 caches 230 and L3 caches 232 is further coupled to local interconnect 114 and to a fabric controller 216 to facilitate participation of caches 230, 232 in the coherent data communication of data processing system 100.

Although the illustrated cache hierarchies includes only three levels of cache, those skilled in the art will appreciate that alternative embodiments may include additional levels (L4, etc.) of on-chip or off-chip, private or shared, in-line or lookaside cache, which may be fully inclusive, partially inclusive, or non-inclusive of the contents of the upper levels of cache.

Each processing unit 104 further includes an integrated and distributed fabric controller 216 responsible for controlling the flow of operations on the interconnect fabric comprising local interconnect 114 and system interconnect 110 and for implementing the coherency communication required to implement the selected cache coherency protocol. Processing unit 104 further includes an integrated I/O (input/output) controller 214 supporting the attachment of one or more I/O devices (not depicted).

In operation, when a hardware thread under execution by a processor core 200 includes a memory access (e.g., load or store) instruction requesting a specified memory access operation to be performed, LSU 202 executes the memory access instruction to determine the target address (e.g., an effective address) of the memory access request. After translation of the target address to a real address, L1 cache 226 is accessed utilizing the target real address. Assuming the indicated memory access cannot be satisfied solely by reference to L1 cache 226, LSU 202 then transmits the memory access request, which includes at least a transaction type (ttype) (e.g., load or store) and the target real address, to its affiliated L2 cache 230 for servicing. In servicing the memory access request, L2 cache 230 may access its associated L3 cache 232 and/or initiate a transaction including the memory access request on the interconnect fabric.

Figure 3:
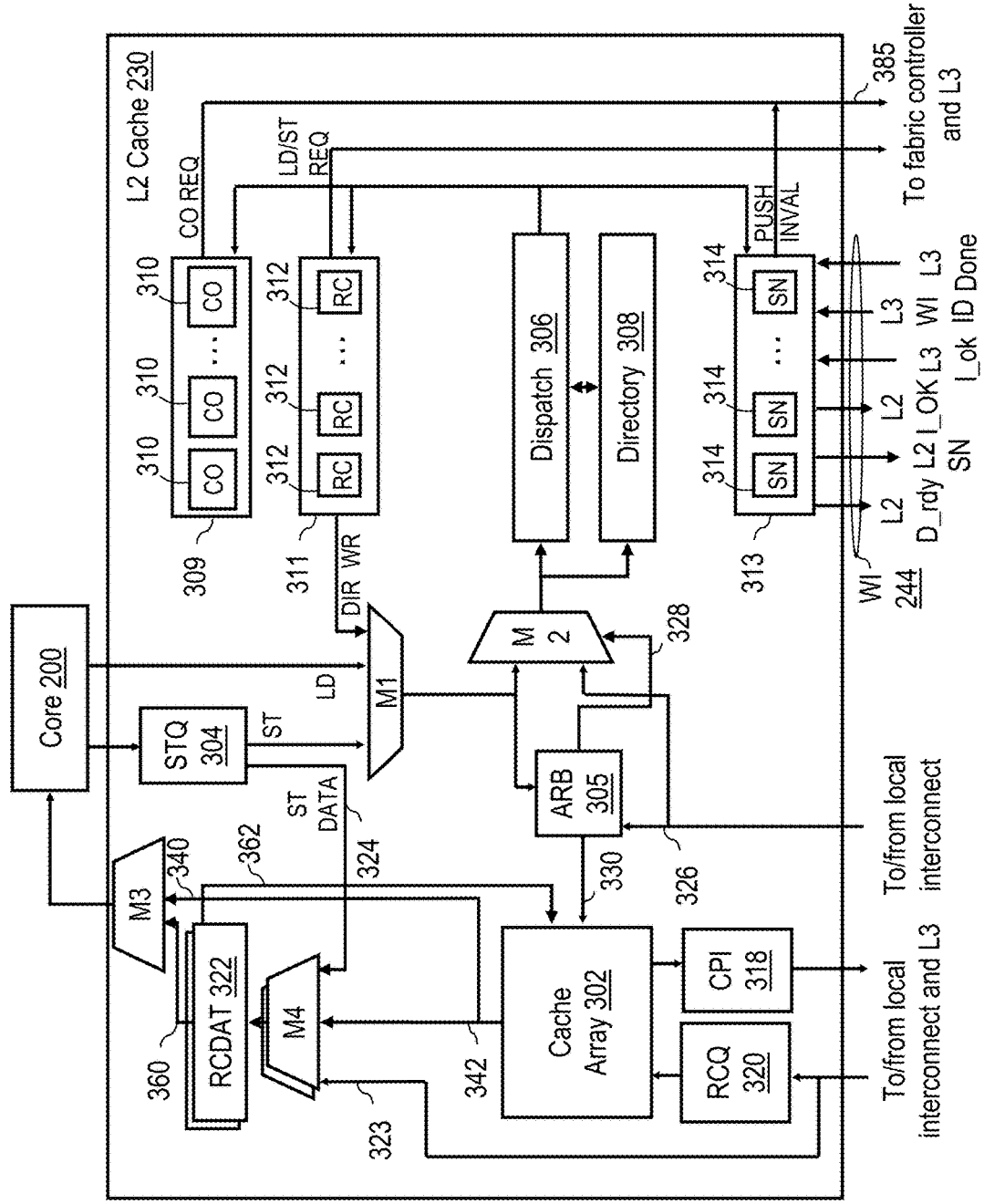
FIG. 3 is a more detailed block diagram of a level two (L2) cache in accordance with one embodiment.

With reference now to FIG. 3, there is illustrated a more detailed block diagram of an exemplary embodiment of an L2 cache 230 in accordance with one embodiment. As shown in FIG. 3, L2 cache 230 includes a cache array 302 and a L2 directory 308 of the contents of cache array 302. Although not explicitly illustrated, cache array 302 preferably is implemented with a single read port and single write port to reduce the die area required to implement cache array 302.

Assuming cache array 302 and L2 directory 308 are set-associative as is conventional, memory locations in system memories 108 are mapped to particular congruence classes within cache array 302 utilizing predetermined index bits within the system memory (real) addresses. The particular memory blocks stored within the cache lines of cache array 302 are recorded in L2 directory 308, which contains one directory entry for each cache line. While not expressly depicted in FIG. 3, it will be understood by those skilled in the art that each directory entry in L2 directory 308 includes various fields, for example, a tag field that identifies the real address of the memory block held in the corresponding cache line of cache array 302, a state field that indicate the coherency state of the cache line, a replacement order (e.g., LRU (Least Recently Used)) field indicating a replacement order for the cache line with respect to other cache lines in the same congruence class, and inclusivity bits indicating whether the memory block is held in the associated L1 cache 226.

L2 cache 230 additionally includes read-claim logic 311 including multiple (e.g., 16) read-claim (RC) machines 312 for independently and concurrently servicing load (LD) and store (ST) requests received from the affiliated processor core 200. As will be appreciated, the servicing of memory access requests by RC machines 312 may require the replacement or invalidation of memory blocks within cache array 302. Accordingly, L2 cache 230 also includes castout logic 309 including multiple CO (castout) machines 310 that independently and concurrently manage the removal of memory blocks from cache array 302 and the storage of those memory blocks in system memory 108 (i.e., writebacks) or an L3 cache 232 (i.e., L3 cast-ins).

In order to service remote memory access requests originating from processor cores 200 other than the affiliated processor core 200, L2 cache 230 also includes snoop logic 313 including multiple snoop machines 314. Snoop machines 314 can independently and concurrently service a remote memory access request "snooped" from local interconnect 114. As shown in FIG. 3, snoop logic 313 is coupled to the associated L3 cache 232 by WI channel 244, which is also illustrated in FIG. 2. WI channel 244 preferably includes (from the perspective of L2 cache 230) multiple signals lines suitable for transmitting at least an L2 data ready (L2 D_rdy) signal (which preferably includes a respective signal line for each SN machine 314 in L2 cache 230), a multi-bit L2 snoop machine ID (L2 SN ID) signal and an L2 inject OK (L2 I_OK) signal, and for receiving an L3 inject OK (L3 I_OK) signal, a multi-bit L3 write inject machine ID (L3 WI ID) signal, and an L3 Done signal (which preferably includes a respective signal line for each WI machine 314 in L3 cache 232).

L2 cache 230 further includes an arbiter 305 that controls multiplexers M1-M2 to order the processing of local memory access requests received from the affiliated processor core 200 and remote memory access requests snooped on local interconnect 114. Such memory access requests, including local load and store requests and remote load and store requests, are forwarded in accordance with the arbitration policy implemented by arbiter 305 to dispatch logic, such as a dispatch pipeline 306, which processes each memory access request with respect to L2 directory 308 and cache array 302 and, if necessary and the required resource is available, dispatches the memory access request to the appropriate state machine for handling.

L2 cache 230 also includes an RC queue (RCQ) 320 and a castout push intervention (CPI) queue 318 that respectively buffer data being inserted into and removed from the cache array 302. RCQ 320 includes a number of buffer entries that each individually correspond to a particular one of RC machines 312 such that each RC machine 312 that is dispatched retrieves data from only the designated buffer entry. Similarly, CPI queue 318 includes a number of buffer entries that each individually correspond to a particular one of the castout machines 310 and snoop machines 314, such that CO machines 310 and snoopers 314 direct transfer of data from cache array 302 (e.g., to another L2 cache 230, to the associated L3 cache 232, or to a system memory 108) via only their respective designated CPI buffer entries.

Each RC machine 312 also has assigned to it a respective one of multiple RC data (RCDAT) buffers 322 for buffering a memory block read from cache array 302 and/or received from local interconnect 114 via reload bus 323. The RCDAT buffer 322 assigned to each RC machine 312 is preferably constructed with connections and functionality corresponding to the memory access requests that may be serviced by the associated RC machine 312. RCDAT buffers 322 have an associated store data multiplexer M4 that selects data bytes from among its inputs for buffering in the RCDAT buffer 322 in response unillustrated select signals generated by arbiter 305.

In operation, a processor core 200 transmits store requests comprising a transaction type (ttype), target real address and store data to a store queue (STQ) 304. From STQ 304, the store data are transmitted to store data multiplexer M4 via data path 324, and the transaction type and target address are passed to multiplexer M1. Multiplexer M1 also receives as inputs processor load requests from processor core 200 and directory write requests from RC machines 312. In response to unillustrated select signals generated by arbiter 305, multiplexer M1 selects one of its input requests to forward to multiplexer M2, which additionally receives as an input a remote memory access request received from local interconnect 114 via remote request path 326. Arbiter 305 schedules local and remote memory access requests for processing and, based upon the scheduling, generates a sequence of select signals 328. In response to select signals 328 generated by arbiter 305, multiplexer M2 selects either the local memory access request received from multiplexer M1 or the remote memory access request snooped from local interconnect 114 as the next memory access request to be processed.

The memory access request selected for processing by arbiter 305 is placed by multiplexer M2 into dispatch pipeline 306. Dispatch pipeline 306 preferably is implemented as a fixed duration pipeline in which each of multiple possible overlapping requests is processed for a predetermined number of clock cycles (e.g., 4 cycles). During the first cycle of processing within dispatch pipeline 306, a directory read is performed utilizing the request address to determine if the request address hits or misses in L2 directory 308, and if the memory address hits, the coherency state of the target memory block. The directory information, which includes a hit/miss indication and the coherency state of the memory block, is returned by L2 directory 308 to dispatch pipeline 306 in a subsequent cycle. As will be appreciated, no action is generally taken within an L2 cache 230 in response to miss on a remote memory access request; such remote memory requests are accordingly discarded from dispatch pipeline 306. However, in the event of a hit or miss on a local memory access request or a hit on a remote memory access request, L2 cache 230 will service the memory access request, which for requests that cannot be serviced entirely within processing unit 104, may entail communication on local interconnect 114 via fabric controller 216.

At a predetermined time during processing of the memory access request within dispatch pipeline 306, arbiter 305 transmits the request address to cache array 302 via address and control path 330 to initiate a cache read of the memory block specified by the request address. The memory block read from cache array 302 is transmitted via data path 342 to multiplexer M4 for insertion into the appropriate RCDAT buffer 322. For processor load requests, the memory block is also transmitted to load data multiplexer M3 via data path 340 for forwarding to the affiliated processor core 200.

At the last cycle of the processing of a memory access request within dispatch pipeline 306, dispatch pipeline 306 makes a dispatch determination based upon a number of criteria, including (1) the presence of an address collision between the request address and a previous request address currently being processed by a castout machine 310, snoop machine 314 or RC machine 312, (2) the directory information, and (3) availability of an RC machine 312 or snoop machine 314 to process the memory access request. If dispatch pipeline 306 makes a dispatch determination that the memory access request is to be dispatched, the memory access request is dispatched from dispatch pipeline 306 to an RC machine 312 or a snoop machine 314. If the memory access request fails dispatch, the failure is signaled to the requestor (e.g., local or remote processor core 200) by a retry response. The requestor may subsequently retry the failed memory access request, if necessary.

While an RC machine 312 is processing a local memory access request, the RC machine 312 has a busy status and is not available to service another request. While an RC machine 312 has a busy status, the RC machine 312 may perform a directory write to update the relevant entry of L2 directory 308, if necessary. In addition, the RC machine 312 may perform a cache write to update the relevant cache line of cache array 302. Directory writes and cache writes may be scheduled by arbiter 305 during any interval in which dispatch pipeline 306 is not already processing other requests according to the fixed scheduling of directory reads and cache reads. When all operations for the given request have been completed, the RC machine 312 returns to an unbusy state.

Associated with RC machines 312 is data handling circuitry, different portions of which are employed during the servicing of various types of local memory access requests. For example, for a local load request that hits in L2 directory 308, a copy of the target memory block is forwarded from cache array 302 to the affiliated processor core 200 via data path 340 and load data multiplexer M3 and additionally forwarded to RCDAT buffer 322 via data path 342. The data forwarded to RCDAT buffer 322 via data path 342 and store data multiplexer M4 is then forwarded from RCDAT 322 to the affiliated processor core 200 via data path 360 and multiplexer M3. For a local store request, store data is received within RCDAT buffer 322 from STQ 304 via data path 324 and store data multiplexer M4, the store is merged with the memory block read into RCDAT buffer 322 from cache array 302 via multiplexer M4, and the merged store data is then written from RCDAT buffer 322 into cache array 302 via data path 362. In response to a local load miss or local store miss, the target memory block acquired through issuing a memory access operation on local interconnect 114 is loaded into cache array 302 via reload bus 323, store data multiplexer M4, RCDAT buffer 322 (with store merge for a store miss) and data path 362.

Figure 4:
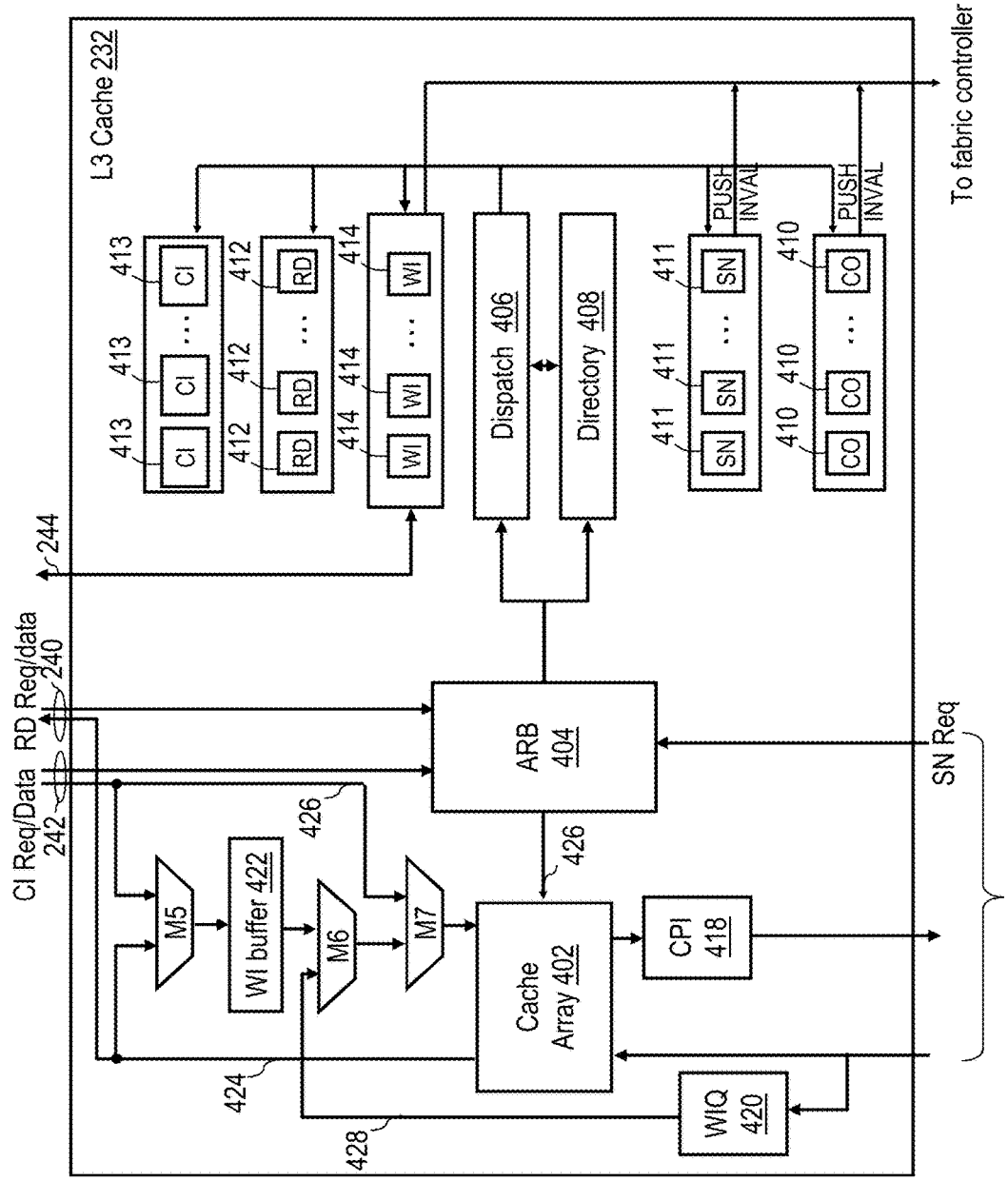
FIG. 4 is a more detailed block diagram of a level three (L3) cache in accordance with one embodiment.
Figure 5:
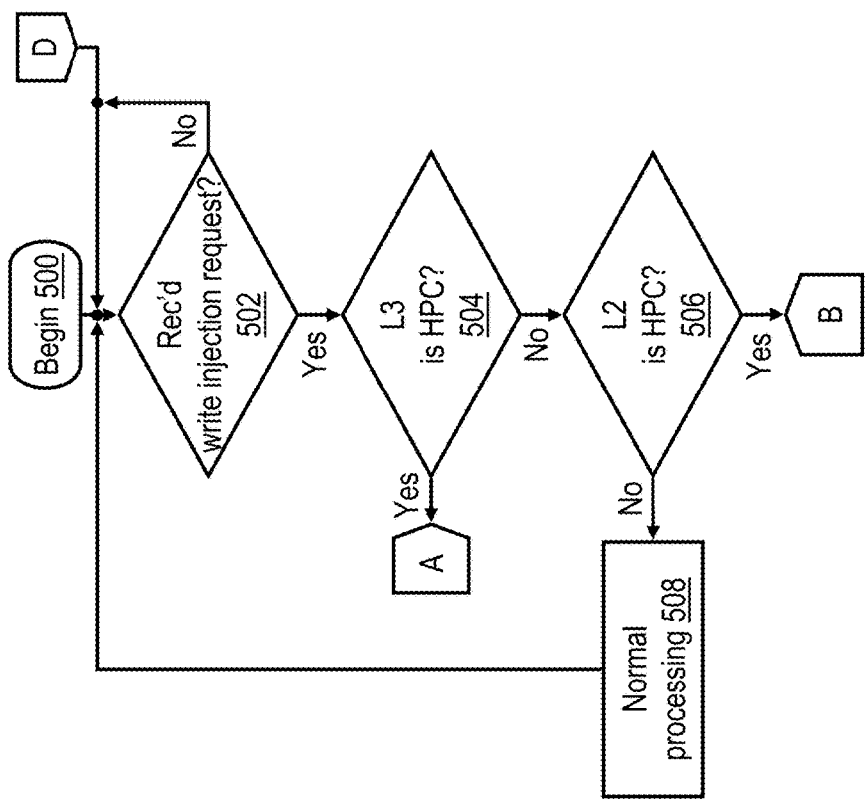
FIGS. 5-8 together form a high level logical flowchart of an exemplary method of injecting at least a partial cache line of data into a lower level cache (e.g., L3 cache) in accordance with one embodiment.

Referring now to FIG. 4, there is depicted a more detailed view of an L3 cache 232 in accordance with one embodiment. As shown in FIG. 4, L3 cache 232 includes a cache array 402 and a L3 directory 408 of the contents of cache array 402. Assuming cache array 402 and L3 directory 408 are set-associative as is conventional, memory locations in system memories 108 are mapped to particular congruence classes within cache array 402 utilizing predetermined index bits within the system memory (real) addresses. The particular memory blocks stored within the cache lines of cache array 402 are recorded in L3 directory 408, which contains one directory entry for each cache line. While not expressly depicted in FIG. 4, it will be understood by those skilled in the art that each directory entry in L3 directory 408 includes various fields, for example, a tag field that identifies the real address of the memory block held in the corresponding cache line of cache array 402, a state field that indicate the coherency state of the cache line, and a replacement order (e.g., LRU) field indicating a replacement order for the cache line with respect to other cache lines in the same congruence class.

L3 cache 232 additionally includes various state machines to service various types of requests and to transfer data into and out of cache array 402. For example, L3 cache 232 includes multiple (e.g., 16) read (RD) machines 412 for independently and concurrently servicing read (RD) requests received from the affiliated L2 cache 230 via RD channel 240. L3 cache 232 also includes multiple snoop (SN) machines 411 for handling remote memory access requests snooped from local interconnect 114 that originate from L2 caches 230 supporting remote processor cores 200. As is known in the art, the servicing of snooped requests may include, for example, invalidating cache lines in L3 directory 408 and/or sourcing cache lines of data from cache array 402 by cache-to-cache intervention. L3 cache 232 additionally includes multiple cast-in (CI) machines 413 for servicing cast-in (CI) requests received from the affiliated L2 cache 230 via CI channel 242. As will be appreciated, the servicing of cast-in requests by CI machines 413 by storing in cache array 402 cache lines castout from the associated L2 cache 230 may require the replacement of memory blocks in cache array 402. Accordingly, L3 cache 232 also includes castout (CO) machines 410 that manage the removal of memory blocks from cache array 402 and, if necessary, the writeback of those memory blocks to system memory 108. Data removed from L3 cache 232 by CO machines 410 and SN machines 411 is buffered in a castout push intervention (CPI) queue 418 prior to transmission to local interconnect 114. In addition, L3 cache 232 includes a plurality of write inject (WI) machines 414 that service requests received on local interconnect 114 to inject partial or full cache lines of data into the cache array 402 of L3 cache 232. Write injection data received in conjunction with write injection requests is temporarily held in a write inject queue 420 (WIQ), which preferably includes one or more entries each having the width of a full cache line (e.g., 128 bytes). In a preferred embodiment, write injection requests are serviced exclusively by L3 cache 232 to avoid introducing additional complexity into higher level caches having lower access latency requirements, such as L2 cache 230.

L3 cache 230 further includes an arbiter 404 that orders the processing of CI requests and RD requests received from the associated L2 cache 230, as well as remote memory access requests and write injection requests snooped from local interconnect 114. These memory access requests are forwarded in accordance with the arbitration policy implemented by arbiter 404 to dispatch logic, such as a dispatch pipeline 406, which processes each memory access request with respect to L3 directory 408 and cache array 402 and, if necessary, dispatches the memory access requests to the appropriate state machines 411, 412, 413 or 414 for processing. If necessary, at a predetermined time during processing of the memory access request within dispatch pipeline 406, arbiter 404 transmits the request's target real address to cache array 402 via address and control path 426 to initiate a cache read of the memory block specified by the request's target real address.

FIG. 4 additionally illustrates data handling logic and data paths utilized to service various types of memory access requests in the illustrated embodiment. In the illustrated embodiment, the data handling logic includes multiplexers M5, M6 and M7 and a write inject buffer 422. The data paths include a data path 424, which can forward data read from cache array 402, for example, in response to a RD request or a WI request, to multiplexer M5 and RD channel 240. L3 cache 232 additionally includes a data path 428, which can forward CI data received from the associated L2 cache 230 to multiplexers M5 and M7. L3 further includes data path 428, which can forward WI data held in WIQ 420 to multiplexer M6. Unillustrated select signals generated by arbiter 404 select which data, if any, is written into cache array 402 by multiplexer M7.

With reference now to FIGS. 5-8, there is illustrated a high level logical flowchart of an exemplary method of injecting at least a partial cache line of write inject data into a lower level cache (e.g., an L3 cache 232) in accordance with one embodiment. The process begins at block 500 of FIG. 5 and then proceeds to block 502, which illustrates a determination of whether or not a write injection request has been received on local interconnect 114 by a pair of associated L2 and L3 caches 230, 232. In one embodiment, a write injection request includes at least a transaction type (ttype) indicating the type of the request (i.e., a write injection request) and the target real address of the write injection data associated with the request. If no write injection request is received at block 502, the process continues to iterate at block 502. However, in response to a receipt of a write injection request at block 502, the process proceeds from block 502 to blocks 504 and 506, which respectively illustrate determinations of whether or not the L3 cache 232 or the L2 cache 230 is the Highest Point of Coherency (HPC) for the target real address of the write injection request.

As utilized herein, a Lowest Point of Coherency (LPC) is defined herein as a memory device or I/O device that serves as the repository for a memory block. In the absence of an HPC for the memory block, the LPC holds the true image of the memory block and has authority to grant or deny requests to generate an additional cached copy of the memory block. For a typical request in the data processing system embodiment of FIGS. 1-4, the LPC will be the memory controller 206 for the system memory 108 holding the referenced memory block. An HPC is defined herein as a unique device (throughout all of data processing system 100) that caches a true image of the memory block (which may or may not be consistent with the corresponding memory block at the LPC) and that has the authority to grant or deny a request to modify the memory block. Thus, at most one of the L2 cache 230 and L3 cache 232 is the HPC for the memory block associated with a given target real address. Descriptively, the HPC may also provide a copy of the memory block to a requesting device. Thus, for a typical memory access request in the data processing system embodiment of FIGS. 1-4, the HPC, if any, will be an L2 cache 230 or L3 cache 232. Although other indicators may be utilized to designate an HPC for a memory block, in a preferred embodiment, the HPC, if any, for a memory block is designated by selected cache coherency state(s) within the cache directory of an L2 cache 230 or L3 cache 232.

In response to a determination at block 504 that the L3 cache 232 is the HPC for the target real address of the write injection request, the process proceeds through page connector A to FIG. 6, which is described below. In response to a determination that the L2 cache 230 is the HPC for that target real address of the write injection request, the process passes through page connector B to FIG. 7, which is described below. If, however, neither L2 cache 230 or L3 cache 232 is the HPC for the target real address of the write injection request, then the write injection request can be serviced in a conventional manner, as shown at block 508. For example, in this case, if L3 cache 232 holds a valid shared copy of the target cache line of the write injection request, the L3 cache 232 may invalidate its copy of the target cache line and provide a coherence response indicating that it no longer holds a copy of the target cache line. Alternatively, L3 cache 232 may request that all other caches holding a copy of the target cache line invalidate their respective copies of the target cache line and merge the write inject data into its copy of the target cache line. Following block 508, the process returns to block 502, which has been described.

Figure 6:
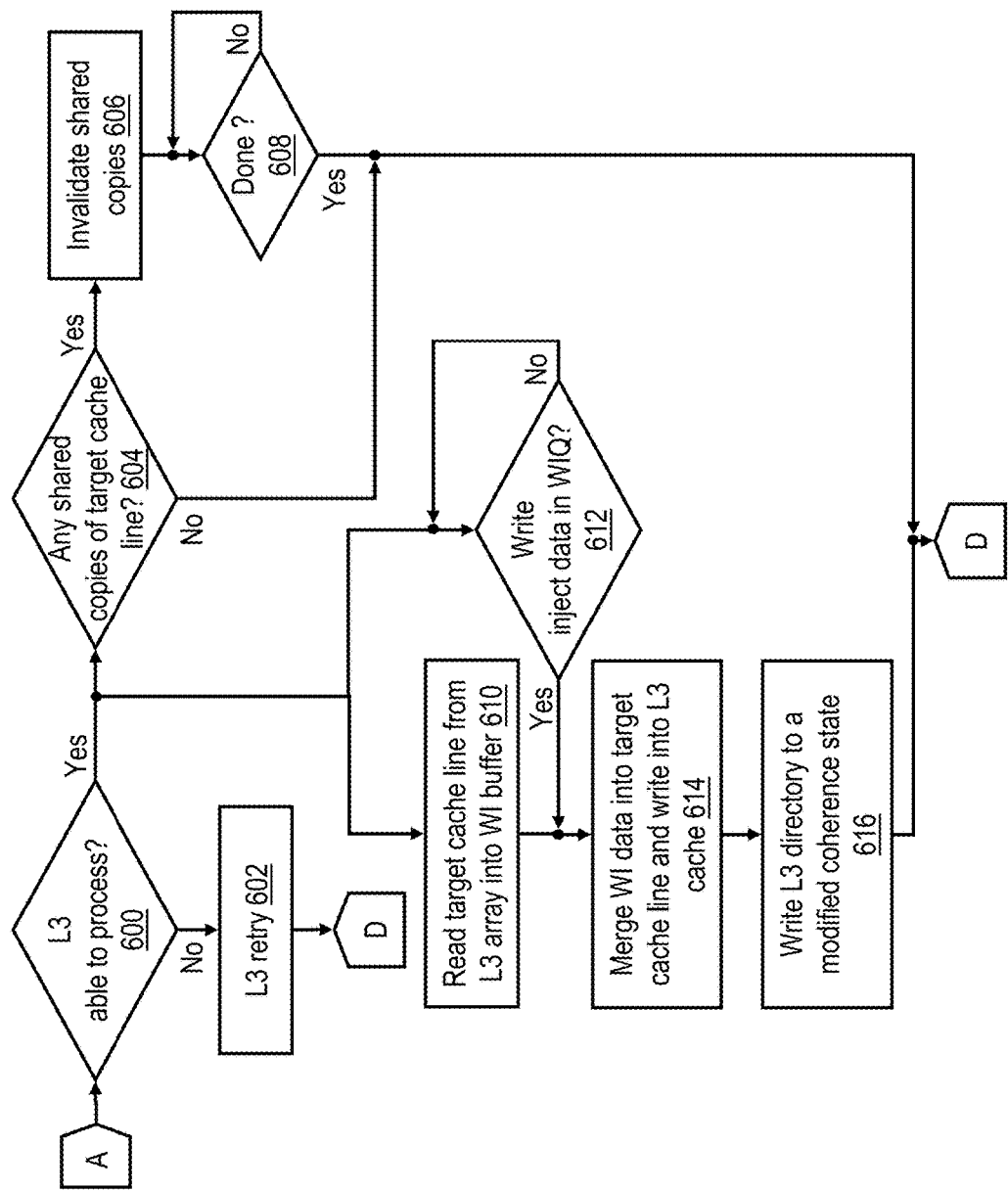

Referring now to FIG. 6, following page connector A, the process passes to block 600, which illustrates L3 cache 232, which is the HPC for the target real address of the memory injection request, determining whether it is currently able to process the write injection request. For example, the determination shown at block 600 may include a determination of whether or not all resources required to service the write injection request, including a WI machine 414, are currently available for allocation to the write injection request. In response to a determination that the L3 cache 232 is not currently able to process the write injection request, the L3 cache 232 provides a retry coherence response to the write injection request on the interconnect fabric (block 602), requesting that the source of the write injection request re-issue the write injection request at a later time. Thereafter, the process returns through page connector D to block 502 of FIG. 5.

Returning to block 600, in response to a determination that L3 cache 232 is presently able to process the write injection request, the process bifurcates and proceeds to blocks 604-608 and 610-616 in parallel. At block 604, L3 cache 232 determines whether or not there may be any shared copies of the target cache line within data processing system 100, for example, by reference to the coherence state of the target real address in its directory 408 and/or an individual or systemwide coherence response to the write injection request. If not, the process simply rejoins the other branch of the process. If, however, the L3 cache 232 determines that there may be at least one shared copy of the target cache line within data processing system 100, L3 cache 232 invalidates any shared copy or copies of the target cache line by issuing one or more kill requests on local interconnect 114 (block 606). Once the other copy or copies of the target cache line have been invalidated (block 608), the process rejoins the other branch of the process.

Turning now to the other branch of the process shown in FIG. 6, arbiter 404 directs cache array 402 via control path 426 to read out the target cache line of the write injection request (block 610). The target cache line is forwarded via data path 424 and multiplexer M5 to WI buffer 422. L3 cache 232 contemporaneously determines at block 612 whether or not the at least partial cache line of write inject data of the write injection request has been received within WIQ 420 from local interconnect 114. In various embodiments, the write inject data may be received from the source of the write injection request contemporaneously with or at a different time than the write injection request. If not, the process waits at block 612 until the write inject data is received. Once the target cache line has been read into WI buffer 422 at block 610 and the write inject data has been received within WIQ 420 at block 612, arbiter 404 controls the selection of bytes of data by multiplexer M6 to merge the partial or full cache line of write inject data into the target cache line (block 614). The updated target cache line is then written into cache array 402 via multiplexer M7. Based on the update to the target cache line, arbiter 404 also writes the corresponding entry in L3 directory 408 to the appropriate modified coherence state, which preferably indicates that the L3 cache 232 remains the HPC of the target memory block (block 616). Following the completion of both branches of the process shown in FIG. 6, servicing of the write injection request is complete, the WI machine 414 allocated to the write injection request is released to return to the unbusy state, and the process returns via page connector D to block 502 of FIG. 5.

Figure 7:
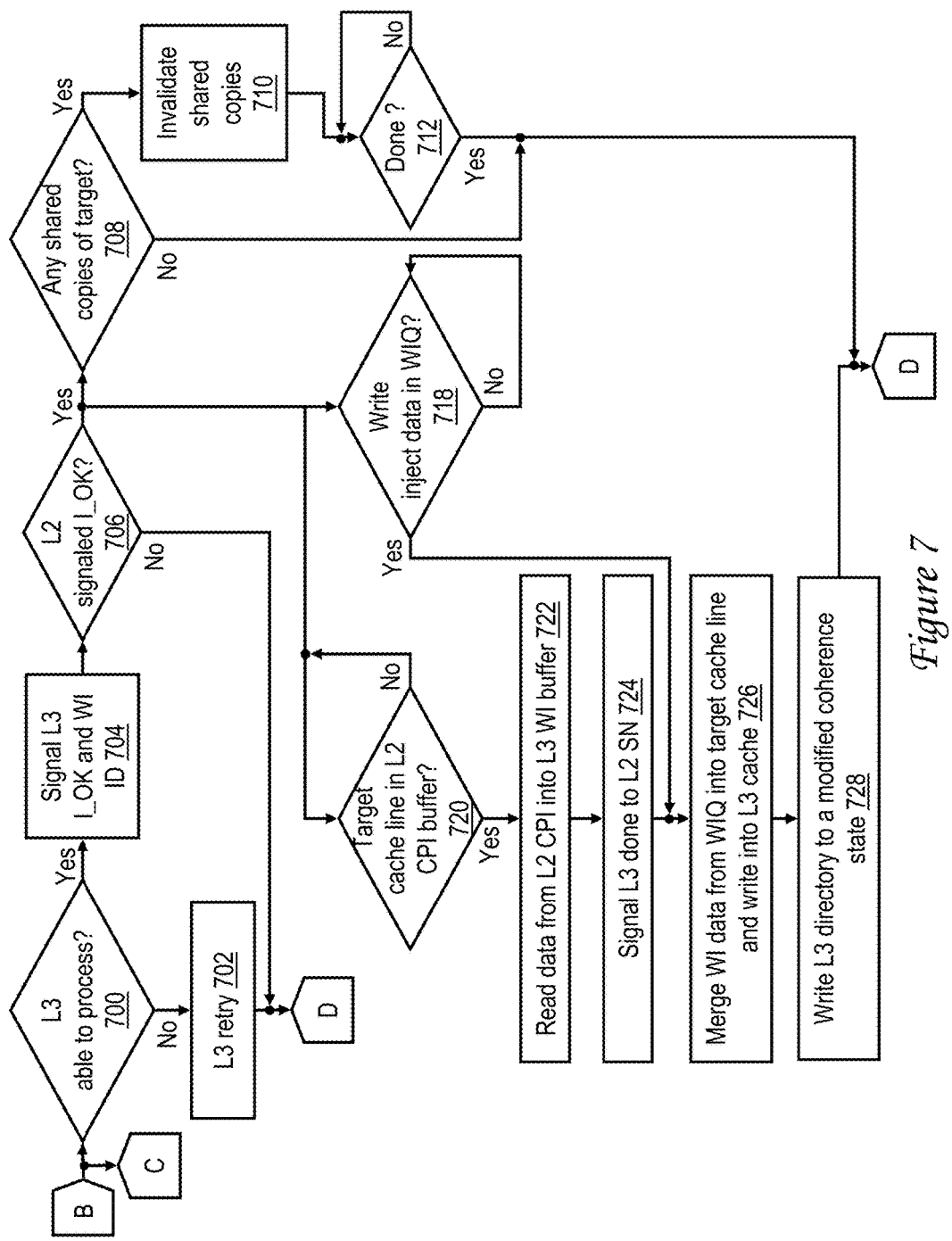
Figure 8:
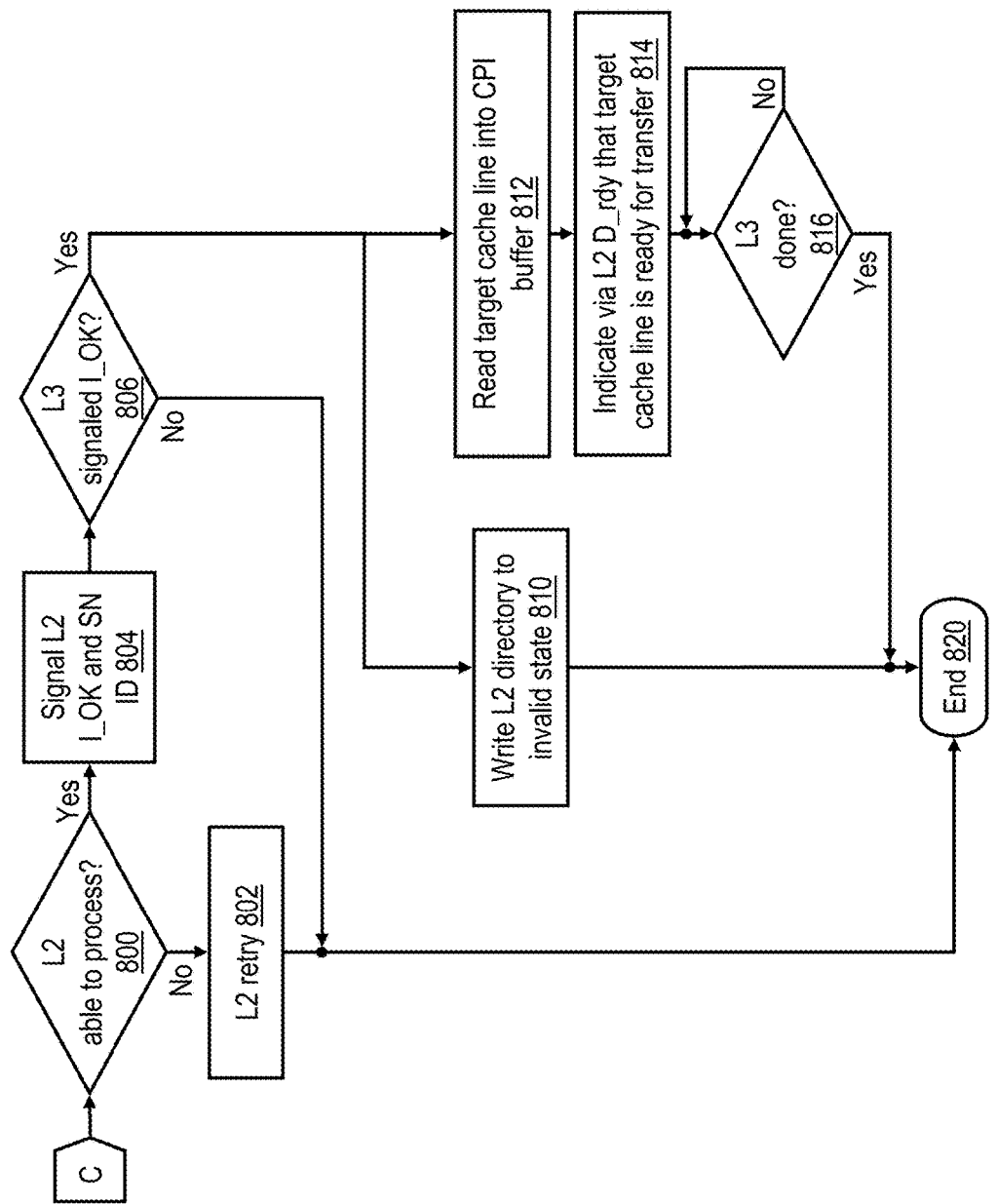

With reference now to FIGS. 7-8, the processing performed in the case that the L2 cache 230 is the HPC for the target cache line of the write injection request is described. The processing begins at page connector B and then bifurcates and proceeds in parallel to the process given in FIG. 7, which illustrates the processing performed by L3 cache 232, and through page connector C to the process given in FIG. 8, which depicts the processing performed by L2 cache 230.

Referring first to FIG. 7, the process proceeds from page connector B to block 700, which illustrates L3 cache 232 determining whether it is currently able to process the write injection request. For example, the determination shown at block 700 may include a determination of whether or not all resources required to service the write injection request, including a WI machine 414, are currently available for allocation to the write injection request. In response to a determination at block 700 that the L3 cache 232 is not currently able to process the write injection request, the L3 cache 232 provides a retry coherence response to the write injection request (block 702), requesting that the source of the write injection request re-issue the write injection request at a later time. Thereafter, the process returns through page connector D to block 502 of FIG. 5.

Returning to block 700, in response to a determination that L3 cache 232 is presently able to process the write injection request, L3 cache 232 allocates the resources necessary to service the write injection request, including a WI machine 414. The allocated WI machine 414 then utilizes WI channel 244 to signal the associated L2 cache 230 that the L3 cache 232 can service the write injection request by asserting L3 I_OK and by providing L2 cache 230 the WI ID of the allocated WI machine 414 (block 704). The WI ID informs L2 cache 230 which of the L3 Done signal lines should be monitored to determine when an L2 SN machine 314 allocated to the write injection request can be released. At block 706, the allocated WI machine 414 then determines whether or not L2 cache 230 has indicated that it can also service the write injection request by asserting L2 I_OK. If not, processing of the write injection request by L3 cache 232 ends, the WI machine 414 allocated to the write injection request is released to return to an unbusy state, and the process returns to block 502 of FIG. 5 via page connector D.

In response to an affirmative determination at block 706, meaning that both the L2 cache 230 and L3 cache 232 are able to process the write injection request, the process again bifurcates and proceeds to blocks 708-712 and 718-728 in parallel. At block 708, L3 cache 232 determines whether or not there may be any shared copies of the target cache line within data processing system 100, for example, by reference to the coherence state information provided by the associated L2 cache 230 and/or an individual or systemwide coherence response to the write injection request. In response to a determination at block 708 that no shared copies of the target cache line are cached in data processing system 100, the process simply rejoins the other branch of the process. If, however, the L3 cache 232 determines that there may be at least one shared copy of the target cache line cached within data processing system 100, WI machine 414 of L3 cache 232 invalidates the shared copy or copies of the target cache line by issuing one or more kill requests on local interconnect 114 (block 710). Once the other copy or copies of the target cache line have been invalidated (block 712), the process rejoins the other branch of the process.

Turning now to block 718, L3 cache 232 determines whether or not the partial or full cache line of write inject data of the write injection request has been received from local interconnect 114 within WIQ 420. As noted above, in various embodiments, the write inject data may be received from the source of the write injection request contemporaneously with or at a different time than the write injection request. If not, the process waits at block 718 until the write inject data is received. Contemporaneously, the L2 cache 230 and L3 cache 232 collaborate to transfer the target cache line of data from the L2 cache 230 to the L3 cache 232. For example, in the illustrated embodiment, L3 cache 232 determines at block 720 whether or not L2 cache 230 has indicated by assertion of one of the L2 D_rdy signals of WI channel 244 that the target cache line has been read out of L2 cache array 302 into L2 CPI buffer 318 (the relevant one of the L2 D_rdy signals is identified by the SN ID provided by the L2 cache 230 at block 804, as described below). If not, the process iterates at block 720. In response to L2 cache 230 indicating that the target cache line has been read into L2 CPI buffer 318, the SN machine 314 of L2 cache 230 allocated to service the write injection request causes the target cache line to be transferred from L2 CPI buffer 318 into WI buffer 422 of L3 cache 232 via CI channel 242, data path 426, and multiplexer M5 (block 722). In response to receipt of the target cache line in WI buffer 422, the WI machine 414 allocated to service the write injection request asserts the appropriate one of the L3 Done signals via WI channel 244 (block 724), releasing the SN machine 314 allocated to service the write injection request to return to a unbusy state in which it is available for allocation to a subsequent request snooped on local interconnect 114.

Following completion of the process shown at blocks 718 and 724, arbiter 404 controls the selection of bytes of data by multiplexer M6 to merge the partial or full cache line of write inject data into the target cache line (block 726). The updated target cache line is then written into cache array 402 via multiplexer M7. Based on the update to the target cache line, arbiter 404 also writes the corresponding entry in L3 directory 408 to the appropriate modified coherence state, which preferably indicates that the L3 cache 232 is the HPC of the target memory block (block 728). Following the completion of the processing illustrated at blocks 728 and 708/712, processing of the write injection request is complete, the WI machine 414 allocated to the write injection request is released to return to the unbusy state, and the process illustrated in FIG. 7 returns via page connector D to block 502 of FIG. 5.

With reference now to FIG. 8, the process proceeds from page connector C to block 800, which illustrates L2 cache 230 determining whether it is currently able to process the write injection request. For example, the determination shown at block 800 may include a determination of whether or not all resources required to service the write injection request, including a SN machine 314, are currently available for allocation to the write injection request. In response to a determination at block 800 that the L2 cache 230 is not currently able to process the write injection request, the L2 cache 232 provides a retry coherence response to the write injection request on the interconnect fabric (block 802), requesting that the source of the write injection request re-issue the write injection request at a later time. Thereafter, the process of FIG. 8 ends at block 820. It should be recalled that in this case, L2 cache 230 will not assert L2 I_OK to indicate that it can process the write injection request, which will also cause the associated L3 cache 232 to terminate processing of the write injection request, as discussed above with reference to block 706.

Returning to block 800, in response to a determination that L2 cache 230 is presently able to process the write injection request, L2 cache 230 allocates the resources necessary to service the write injection request, including a SN machine 314. The allocated SN machine 314 then utilizes WI channel 244 to signal the associated L3 cache 232 that the L2 cache 230 can service the write injection request by asserting L2 I_OK and by providing L3 cache 232 the SN ID of the allocated SN machine 314 (block 804). The SN ID provided by the L2 cache 230 identifies which of the L2 D_rdy signals the WI machine 414 monitors at block 720 of FIG. 7. The SN machine 314 then determines at block 806 whether or not the associated L3 cache 232 has indicated that it can also service the write injection request by asserting L3 I_OK. If not, the SN machine 314 allocated to service the write injection request is released to return to an unbusy state, and the process of FIG. 8 ends at block 820.

In response to an affirmative determination at block 806, meaning that both the L2 cache 230 and L3 cache 232 are able to process the write injection request, the process bifurcates and proceeds to blocks 810 and 812-816 in parallel. At block 810, SN machine 314 of L2 cache 230 updates the entry in L2 directory 308 associated with the target cache line of the write injection request to an invalid coherence state. In addition, at block 812, arbiter 305 directs cache array 302 via control path 330 to read out the target cache line into L2 CPI buffer 318. In response to the target cache line being placed into L2 CPI buffer 318, SN machine 314 asserts the appropriate one of L2 D_rdy signals at block 814 to indicate to the L3 WI machine 414 in the associated L3 cache 232 that the target cache line of data is ready for transfer to the L3 cache 232 (see e.g., block 720 of FIG. 7). SN machine 314 then awaits assertion by the L3 WI machine 414 of its associated L3 Done signal to indicate that the target cache line has been successfully transferred from L2 CPI buffer 318 to L3 cache 232 (block 816). In response to completion of the processing depicted at blocks 810 and 816, the SN machine 314 is deallocated (returns to an unbusy state), and the process of FIG. 8 ends at block 820.

Figure 9:
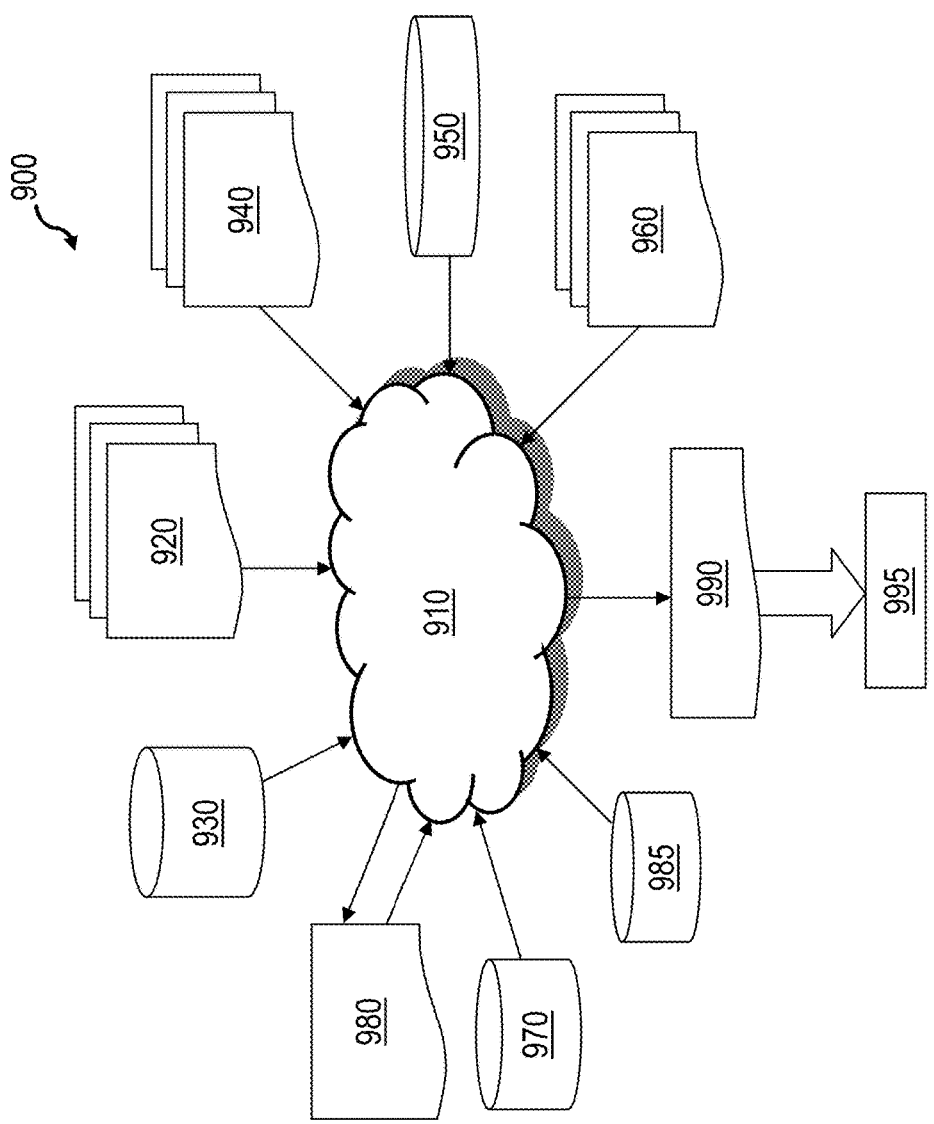
FIG. 9 is a data flow diagram illustrating a design process.

With reference now to FIG. 9, there is depicted a block diagram of an exemplary design flow 900 used for example, in semiconductor IC logic design, simulation, test, layout, and manufacture. Design flow 900 includes processes, machines and/or mechanisms for processing design structures or devices to generate logically or otherwise functionally equivalent representations of the design structures and/or devices described above and shown herein. The design structures processed and/or generated by design flow 900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 900 may vary depending on the type of representation being designed. For example, a design flow 900 for building an application specific IC (ASIC) may differ from a design flow 900 for designing a standard component or from a design flow 900 for instantiating the design into a programmable array, for example a programmable gate array (PGA) or a field programmable gate array (FPGA) offered by Altera® Inc. or Xilinx® Inc.

FIG. 9 illustrates multiple such design structures including an input design structure 920 that is preferably processed by a design process 910. Design structure 920 may be a logical simulation design structure generated and processed by design process 910 to produce a logically equivalent functional representation of a hardware device. Design structure 920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD) such as implemented by a core developer/designer. When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system such as those shown herein. As such, design structure 920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 910 preferably employs and incorporates hardware and/or software modules for synthesizing, translating, or otherwise processing a design/simulation functional equivalent of the components, circuits, devices, or logic structures shown herein to generate a netlist 980 which may contain design structures such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 910 may include hardware and software modules for processing a variety of input data structure types including netlist 980. Such data structure types may reside, for example, within library elements 930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 940, characterization data 950, verification data 960, design rules 970, and test data files 985 which may include input test patterns, output test results, and other testing information. Design process 910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 910 without deviating from the scope and spirit of the invention. Design process 910 may also include modules for performing standard circuit design processes such as timing analysis, verification, design rule checking, place and route operations, etc.

Design process 910 employs and incorporates logic and physical design tools such as HDL compilers and simulation model build tools to process design structure 920 together with some or all of the depicted supporting data structures along with any additional mechanical design or data (if applicable), to generate a second design structure 990. Design structure 990 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 920, design structure 990 preferably comprises one or more files, data structures, or other computer-encoded data or instructions that reside on transmission or data storage media and that when processed by an ECAD system generate a logically or otherwise functionally equivalent form of one or more of the embodiments of the invention shown herein. In one embodiment, design structure 990 may comprise a compiled, executable HDL simulation model that functionally simulates the devices shown herein.

Design structure 990 may also employ a data format used for the exchange of layout data of integrated circuits and/or symbolic data format (e.g., information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown herein. Design structure 990 may then proceed to a stage 995 where, for example, design structure 990: proceeds to tape-out, is released to manufacturing, is released to a mask house, is sent to another design house, is sent back to the customer, etc.

As has been described, in at least one embodiment, a processor core is supported by an upper level cache and a lower level cache that receives, from an interconnect fabric of a data processing system, a write injection request requesting injection of a partial cache line of data into a target cache line identified by a target real address. In response to receipt of the write injection request, a determination is made that the upper level cache is a highest point of coherency for the target real address. In response to the determination, the upper level cache and lower level cache collaborate to transfer the target cache line from the upper level cache to the lower level cache. The lower level cache updates the target cache line by merging the partial cache of data into the target cache line and storing the updated target cache line in the lower level cache.

While various embodiments have been particularly shown and described, it will be understood by those skilled in the art that various changes in form and detail may be made therein without departing from the spirit and scope of the appended claims and these alternate implementations all fall within the scope of the appended claims. For example, although aspects have been described with respect to a computer system executing program code that directs the functions of the present invention, it should be understood that present invention may alternatively be implemented as a program product including a computer-readable storage device storing program code that can be processed by a data processing system. The computer-readable storage device can include volatile or non-volatile memory, an optical or magnetic disk, or the like, but excludes non-statutory subject matter, such as propagating signals per se, transmission media per se, and forms of energy per se.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A method of data processing in a data processing system including a processor core supported by an upper level cache and a lower level cache, the method comprising:

receiving, at the lower level cache from an interconnect fabric, a write injection request requesting injection of a partial cache line of data into a target cache line identified by a target real address;

in response to receipt of the write injection request, determining that the upper level cache is a highest point of coherency for the target real address;

in response to determining the upper level cache is the highest point of coherency for the target real address, the upper level cache and lower level cache collaborating to transfer the target cache line from the upper level cache to the lower level cache; and the lower level cache updating the target cache line received from the upper level cache by merging the partial cache of data into the target cache line and storing the updated target cache line in the lower level cache.

2. The method of claim 1, wherein the collaborating includes the upper level cache and the lower level cache communicating via a private communication channel.

3. The method of claim 1, wherein the collaborating includes:

in response to receipt of the write injection request, the upper level cache casting out the target cache line to the lower level cache.

4. The method of claim 1, wherein:

the collaborating is performed in response to determining that both the upper level cache and the lower level cache are able to process the write injection request; and in response to determining that at least one of the upper level cache and the lower level cache is not able to process the write injection request, providing a retry coherence response to the write injection request.

5. The method of claim 1, wherein:

the method includes the lower level cache allocating a write injection machine among a plurality of write injection machines to service the write injection request, said write injection machine having an associated identifier; and the collaborating includes the lower level cache providing the identifier of the write injection machine to the upper level cache.

6. The method of claim 1, and further comprising:

the lower level cache determining that at least one shared copy of the target cache line resides elsewhere in the data processing system; and in response to determining that at least one shared copy of the target cache line is cached elsewhere in the data processing system, the lower level cache issuing at least one kill request on the interconnect fabric of the data processing system to invalidate the at least one shared copy of the target cache line.

7. A processing unit for a data processing system, the processing unit comprising:

a processor core supported by a cache hierarchy including an upper level cache and a lower level cache, wherein the cache hierarchy is configured to perform:

receiving, from an interconnect fabric of the data processing system, a write injection request requesting injection of a partial cache line of data into a target cache line identified by a target real address;

in response to receipt of the write injection request, determining that the upper level cache is a highest point of coherency for the target real address;

in response to determining the upper level cache is the highest point of coherency for the target real address, the lower level cache collaborating with the upper level cache to transfer the target cache line from the upper level cache to the lower level cache; and the lower level cache updating the target cache line received from the upper level cache by merging the partial cache of data into the target cache line and storing the updated target cache line in the lower level cache.

8. The processing unit of claim 7, wherein:

the processing unit further comprises a private communication channel coupling the upper level cache and the lower level cache; and the collaborating includes the upper level cache and the lower level cache communicating via the private communication channel.

9. The processing unit of claim 7, wherein:

the upper level cache includes a snoop machine; and the collaborating includes that snoop machine, responsive to receipt of the write injection request, casting out the target cache line to the lower level cache.

10. The processing unit of claim 7, wherein:

the collaborating is performed responsive determining that both the upper level cache and the lower level cache are able to process the write injection request; and the cache hierarchy, responsive to determining that at least one of the upper level cache and the lower level cache is not able to process the write injection request, is configured to provide a retry coherence response to the write injection request.

11. The processing unit of claim 7, wherein:

the lower level cache includes a plurality of write injection machines including a write injection machine allocated to service the write injection request, said write injection machine having an associated identifier; and the collaborating includes the lower level cache providing the identifier of the write injection machine to the upper level cache.

12. The processing unit of claim 7, wherein:

the lower level cache is further configured to determine that at least one shared copy of the target cache line resides elsewhere in the data processing system and, responsive to determining that at least one shared copy of the target cache line is cached elsewhere in the data processing system, issues at least one kill request on the interconnect fabric of the data processing system to invalidate the at least one shared copy of the target cache line.

13. A data processing system, comprising:

a plurality of processing units in accordance with claim 7; and the interconnect fabric coupling the plurality of processing units.

14. A design structure tangibly embodied in a machine-readable storage medium for designing, manufacturing, or testing an integrated circuit, the design structure comprising:

a processing unit including a processor core supported by a cache hierarchy including an upper level cache and a lower level cache, wherein the cache hierarchy is configured to perform:

receiving, from an interconnect fabric of the data processing system, a write injection request requesting injection of a partial cache line of data into a target cache line identified by a target real address;

in response to receipt of the write injection request, determining that the upper level cache is a highest point of coherency for the target real address;

in response to determining the upper level cache is the highest point of coherency for the target real address, the lower level cache collaborating with the upper level cache to transfer the target cache line from the upper level cache to the lower level cache; and the lower level cache updating the target cache line received from the upper level cache by merging the partial cache of data into the target cache line and storing the updated target cache line in the lower level cache.

15. The design structure of claim 14, wherein:

the processing unit further comprises a private communication channel coupling the upper level cache and the lower level cache; and the collaborating includes the upper level cache and the lower level cache communicating via the private communication channel.

16. The design structure of claim 14, wherein:

the upper level cache includes a snoop machine; and the collaborating includes that snoop machine, responsive to receipt of the write injection request, casting out the target cache line to the lower level cache.

17. The design structure of claim 14, wherein:

the collaborating is performed responsive determining that both the upper level cache and the lower level cache are able to process the write injection request; and the cache hierarchy, responsive to determining that at least one of the upper level cache and the lower level cache is not able to process the write injection request, is configured to provide a retry coherence response to the write injection request.

18. The design structure of claim 14, wherein:

the lower level cache includes a plurality of write injection machines including a write injection machine allocated to service the write injection request, said write injection machine having an associated identifier; and the collaborating includes the lower level cache providing the identifier of the write injection machine to the upper level cache.

19. The design structure of claim 14, wherein:

the lower level cache is further configured to determine that at least one shared copy of the target cache line resides elsewhere in the data processing system and, responsive to determining that at least one shared copy of the target cache line is cached elsewhere in the data processing system, issues at least one kill request on the interconnect fabric of the data processing system to invalidate the at least one shared copy of the target cache line.

20. The design structure of claim 14, wherein the design structure comprises a hardware description language (HDL) design structure.

* * * * *